(12) United States Patent  
Lee

(10) Patent No.: US 9,109,769 B2
(45) Date of Patent: Aug. 18, 2015

(54) PORTABLE CORDLESS MULTIPURPOSE LIGHTING SYSTEM

(71) Applicant: James M. Lee, Georgetown, TX (US)

(72) Inventor: James M. Lee, Georgetown, TX (US)

( * ) Notice: Subject to any disclaimer, the term of this patent is extended or adjusted under 35 U.S.C. 154(b) by 5 days.

(21) Appl. No.: 14/186,788

(22) Filed: Feb. 21, 2014

(65) Prior Publication Data

US 2014/0268711 A1 Sep. 18, 2014

Related U.S. Application Data

(60) Provisional application No. 61/798,496, filed on Mar. 15, 2013.

(51) Int. Cl.
| | |
|---|---|
| F21L 4/00 | (2006.01) |
| F21V 19/00 | (2006.01) |
| F21V 33/00 | (2006.01) |
| F21S 9/02 | (2006.01) |
| F21V 21/092 | (2006.01) |
| F21V 21/32 | (2006.01) |
| G01B 11/24 | (2006.01) |
| G01B 11/00 | (2006.01) |
| F21W 131/402 | (2006.01) |
| F21Y 101/02 | (2006.01) |
| F21Y 105/00 | (2006.01) |

(52) U.S. Cl.
CPC ............. *F21S 9/02* (2013.01); *F21V 21/092* (2013.01); *F21V 21/32* (2013.01); *G01B 11/00* (2013.01); *G01B 11/24* (2013.01); *F21W 2131/402* (2013.01); *F21Y 2101/02* (2013.01); *F21Y 2105/001* (2013.01)

(58) Field of Classification Search
CPC ............... F21L 4/02; F21L 4/027; F21L 4/04; F21V 21/145; F21V 21/26; F21V 21/28; F21V 21/29; F21V 21/30; F21V 21/32
USPC .......................... 362/191, 184, 154, 198, 199
See application file for complete search history.

(56) References Cited

U.S. PATENT DOCUMENTS

| | | | | |
|---|---|---|---|---|
| 3,584,822 | A * | 6/1971 | Oram | 248/160 |
| 6,000,812 | A * | 12/1999 | Freeman et al. | 362/249.01 |
| 6,220,723 | B1 * | 4/2001 | Freeman et al. | 362/240 |
| D524,977 | S * | 7/2006 | Smith et al. | D26/60 |
| D525,736 | S * | 7/2006 | Smith et al. | D26/60 |
| D535,046 | S * | 1/2007 | Smith et al. | D26/60 |
| D562,485 | S * | 2/2008 | Brown | D26/60 |
| 7,390,105 | B2 * | 6/2008 | Nelson et al. | 362/198 |
| 8,648,774 | B2 * | 2/2014 | Kline et al. | 345/46 |
| 8,721,119 | B2 * | 5/2014 | Chu et al. | 362/249.03 |

(Continued)

*Primary Examiner* — Jong-Suk Lee
*Assistant Examiner* — Bryon T Gyllstrom
(74) *Attorney, Agent, or Firm* — Law Offices of Mark L. Berrier

(57) ABSTRACT

Systems and methods for lighting body panels of automobiles to facilitate repair of the body panels, where one embodiment is a portable lighting apparatus that includes a light board, a base and an extension member that connects the light board to the base. The light board is supported by the extension member, which is supported by the base. A battery in the base provides power through conductors in the extension member to light sources in the light board. A slip ring in the extension member couples the conductors together so that they can rotate, thereby allowing the light board to rotate with respect to the base, without twisting the conductors. A suction cup mount on the base enables the base to be secured to an automobile body panel, and the extension member allows the light board to be positioned as desired.

19 Claims, 5 Drawing Sheets

(56) References Cited

U.S. PATENT DOCUMENTS

| | | | |
|---|---|---|---|
| 2003/0193795 A1* | 10/2003 | Brown | 362/84 |
| 2004/0004844 A1* | 1/2004 | Ryan, Jr. | 362/545 |
| 2004/0031177 A1* | 2/2004 | Gordon et al. | 40/551 |
| 2004/0037077 A1* | 2/2004 | Showers et al. | 362/249 |
| 2004/0264206 A1* | 12/2004 | Miller | 362/487 |
| 2007/0086193 A1* | 4/2007 | Chen | 362/276 |
| 2007/0230176 A1* | 10/2007 | Blazick | 362/253 |
| 2008/0244944 A1* | 10/2008 | Nall et al. | 40/544 |
| 2010/0061025 A1* | 3/2010 | Parker et al. | 361/42 |
| 2010/0149806 A1* | 6/2010 | Yiu | 362/249.02 |

* cited by examiner

PORTABLE CORDLESS MULTIPURPOSE LIGHTING SYSTEM

CROSS-REFERENCE TO RELATED APPLICATIONS

This application is a conversion of, and claims the benefit of, U.S. Provisional Patent Application 61/798,496, by James M. Lee, filed Mar. 15, 2013, which incorporated by reference as if set forth herein in its entirety.

BACKGROUND

1. Field of the Invention

The invention relates generally to lighting systems, and more particularly to systems and methods for providing lighting suitable for use in paintless dent removal, where the provided illumination is conveniently positioned and easily controlled to have desired illumination characteristics.

2. Related Art

Paintless dent removal is a set of techniques for repairing damage to the body of an automobile. Generally, these techniques involve using tools on the insides of body panels to push dents from the panels. The use of lights positioned near the body panels allows a technician to more clearly see the dents and to determine when the dents have been adequately repaired.

Various types of lighting systems are available for this purpose. Conventional lighting systems, however, have a number of drawbacks. For instance, it may be difficult to position the lighting systems properly with respect to the body panels, the lighting systems may not be able to produce light having the desired characteristics, and so on. The various embodiments of the lighting systems disclosed herein may reduce or eliminate some of the problems associated with conventional lighting systems.

SUMMARY OF THE INVENTION

This disclosure is directed to systems and methods for lighting body panels of automobiles to facilitate repair of the body panels. One particular embodiment comprises a portable lighting apparatus that includes a light board, a base and an extension member that connects the light board to the base. The light board is connected to the extension member, which is in turn connected to the base. The base supports the extension member, and the extension member supports the light board. The base includes a mount that allows it to be secured to a body panel of an automobile that is being repaired. In one embodiment, the mount is a suction cup mount that can be easily attached to or removed from the body panel. The base may also have a flat portion that is designed to allow the base to sit on the ground and still hold the extension and light board in a desired position. The extension member is bendable to allow the light board to be positioned as desired with respect to the body panel.

The base includes a battery that supplies power to the light sources in the light board. In one embodiment, the battery is coupled to the light sources through a set of switches on the base. The switches allow the light sources to be selectively turned on and off, thereby providing light having a desired set of characteristics. The electrical power is conveyed from the base to the light board through the extension member. In one embodiment, the extension member has a passageway through it, and the conductors that carry the power from the base to the light board are contained entirely within the extension member. A slip ring which couples a first set of electrical conductors from the base to a second set of electrical conductors from the light board is provided in the extension member. The slip ring allows the first and second sets of electrical conductors to rotate with respect to each other. As a result, the light board can be rotated with respect to the base without twisting or binding the electrical conductors. This reduces stresses and wear on the electrical conductors and eliminates one point of failure that is found in conventional lighting systems.

The light board has multiple, selectable light sources, such as LED strips that can be used to provide various different types of light. Each of the types of light has a unique set of characteristics, such as color temperature, position on the light board, intensity, contrast, and so on. The LED strips or other light sources may be mounted on a housing of the light board. The interior of the housing may have a reflective surface to increase the intensity of the light produced by the light board. A cover made of acrylic or other transparent or semi-transparent material may be secured over the light sources to protect them and possibly to diffuse the light from the light sources. The cover may be removable and replaceable.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
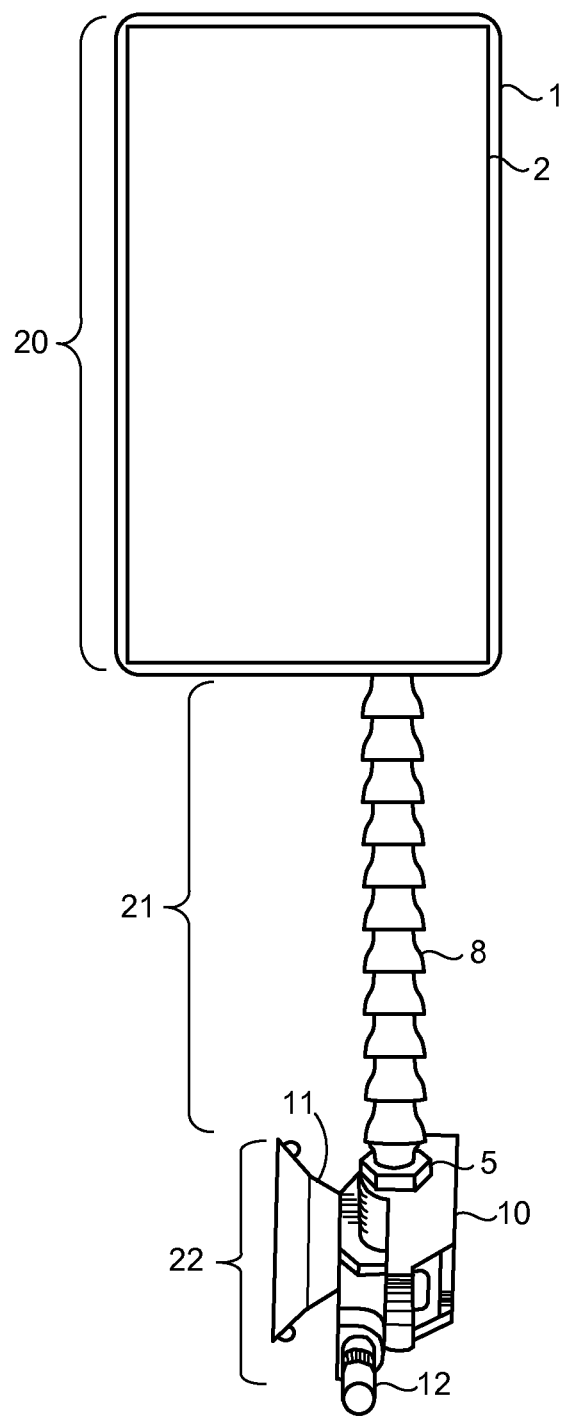
FIG. 1 is a front view of a lighting system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for providing easily positioned lighting that has switchable illumination characteristics.

Figure 2:
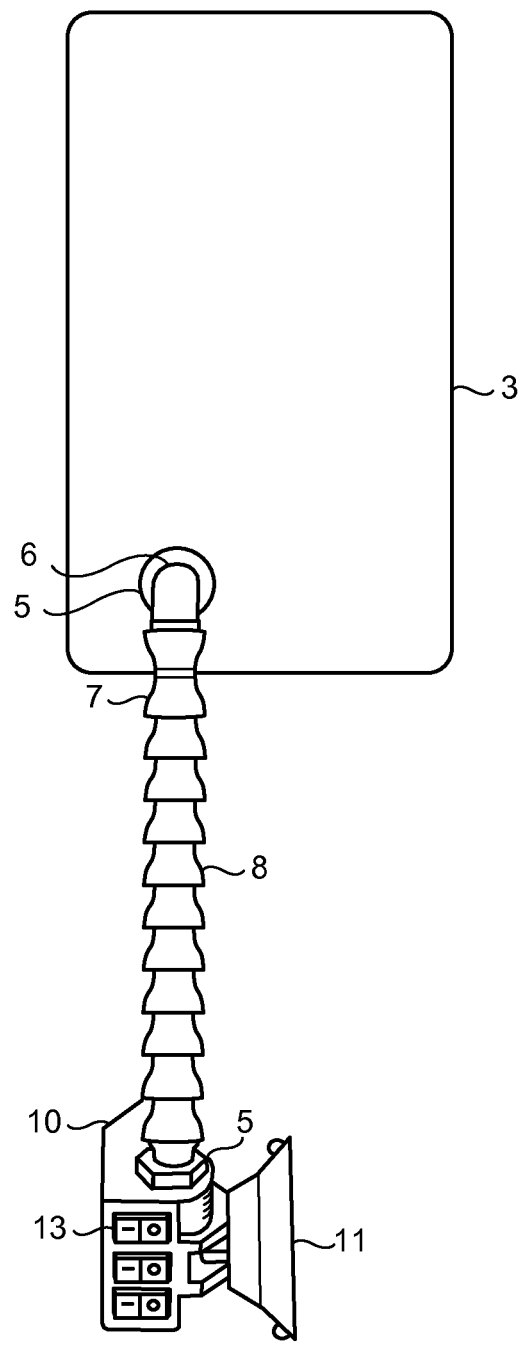
FIG. 2 is a back view of a lighting system in accordance with one embodiment.
Figure 3:
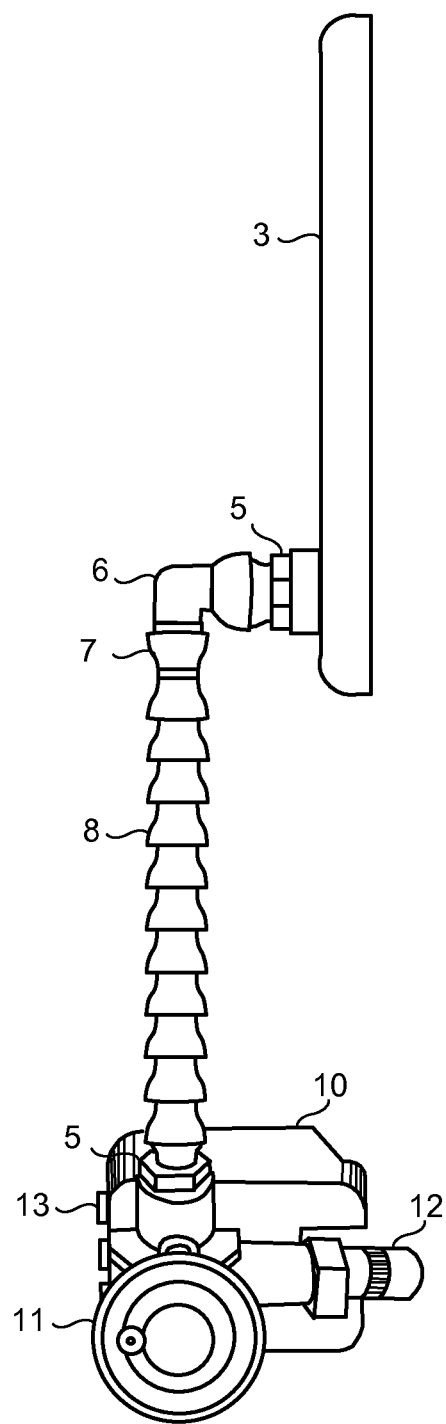
FIG. 3 is a right side view of a lighting system in accordance with one embodiment.
Figure 4:
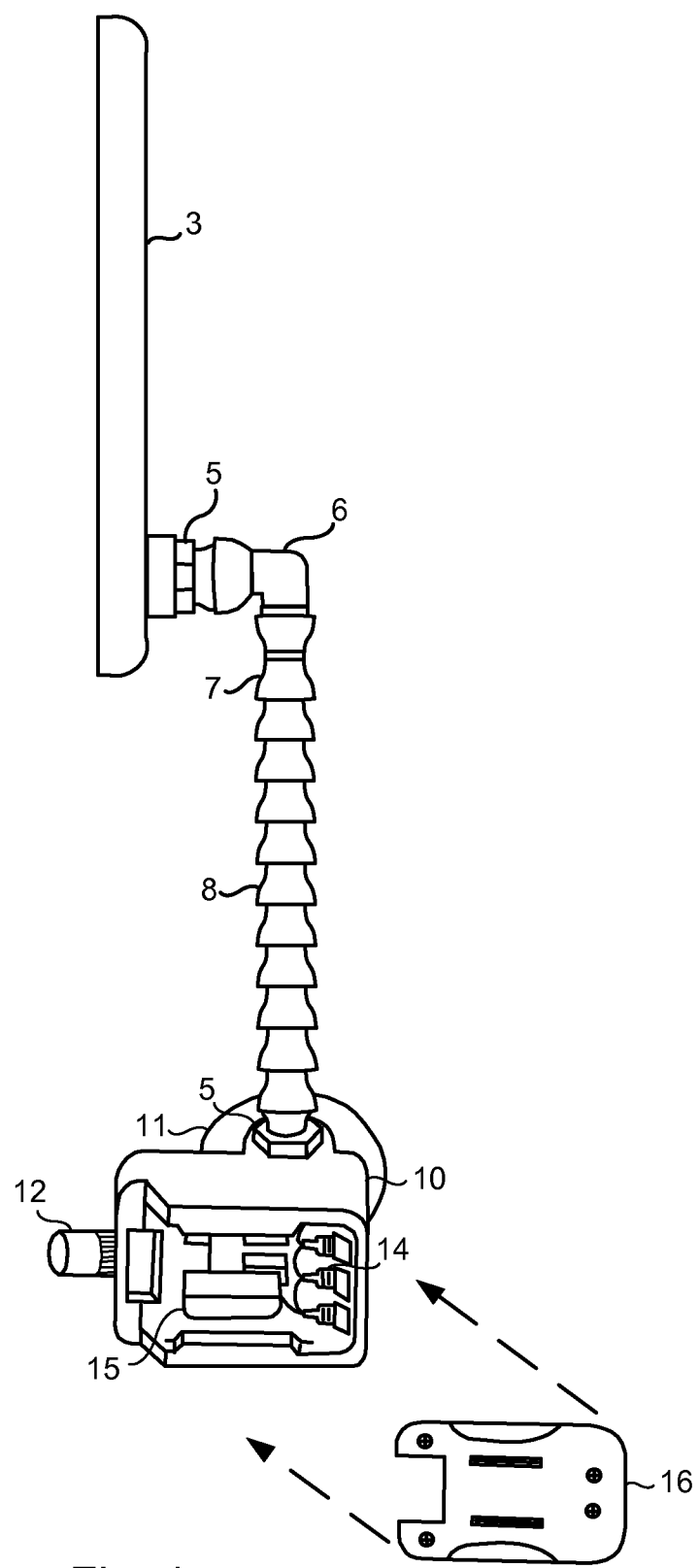
FIG. 4 is a left side view of a lighting system in accordance with one embodiment.
Figure 5:
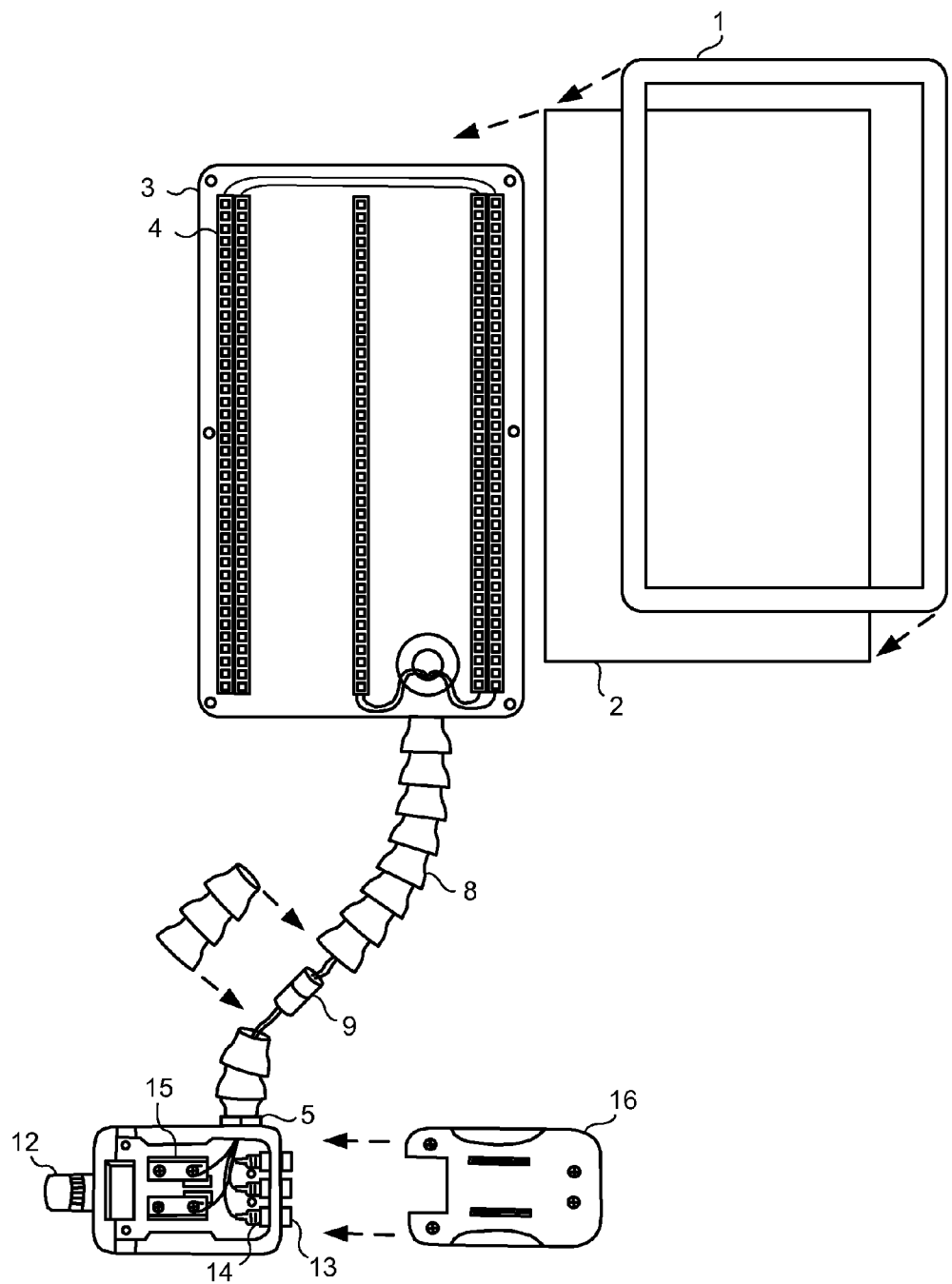
FIG. 5 is a partially exploded view of a lighting system in accordance with one embodiment.

One embodiment of the lighting system of the present invention is described below with reference to FIGS. 1-5.

In one embodiment, a light board 20 is connected to a neck or extension 21, which is in turn connected to a base assembly 22. The light board contains multiple, selectable light sources or combinations of light sources that are configured to produce different types of lighting, each of which may be well suited to a particular use. The light sources may have different positioning within the light board, different color temperatures, different intensities or other varying characteristics. As an example, one type of lighting may be generated by a single, narrow strip of LEDs near one edge of the light board. When this edge of the light board is positioned near a vehicle's body panel so that the light is nearly parallel to the panel, dents may be more easily visible as shadows. With the light board in the same position, strips of LEDs in the center and opposite edge of the light board may be energized to provide illumination that produces a less stark contrast associated with dents, but may make it easier to see differences in paint colors across the body panel.

Light board 20 is connected to base assembly 22 by extension 21. The connection is designed to allow light board 20 to pivot and/or swivel at the end of extension 21 to facilitate positioning of the light board with respect to the vehicle body panel (or other workpiece). Extension 21 is flexible in this embodiment, but is stiff enough to support light board 20. Extension 21 is also hollow, so as to allow wiring between the battery (in base assembly 22) and the light sources (in light board 20) to be located therein.

Base assembly 22 houses a battery that is used to power the LEDs or other light sources in light board 20. The battery is removable and rechargeable, and may be configured to be interchangeable with batteries of the type that are commonly used in cordless power tools. The battery is coupled through a set of switches (e.g., 13) and a slip ring 9 to the light sources in light board 20. The switches allow the light sources to be selectively switched on and off, while the slip ring allows the wires which are connected to the battery and switches to rotate freely with respect to the wires which are connected to the light sources. Base assembly 22 includes an attachment means such as a suction cup 11 which allows the base assembly to be attached to a workpiece such as a vehicle body panel. Once base assembly 22 is attached to the workpiece, the base assembly supports extension 21, which in turn supports light board 20. In one embodiment, base assembly 22 is shaped to allow it to be set on the ground or another flat surface if it is impractical to attach it to the workpiece.

Thus, in operation, this embodiment of the lighting system is attached to a workpiece, the light board is appropriately positioned with respect to the workpiece, and the light sources within the light board are energized to illuminate the workpiece. The characteristics of the illumination produced by the light board may be changed by setting the switches to energize appropriate light sources to generate illumination with the desired characteristics.

The lighting system of FIGS. 1-5 will now be described in more detail.

Part 1 is an LED tray housing cover. Tray housing cover frame 1 is optional, but is used in this embodiment to secure acrylic sheet 2 to light tray housing 3. The acrylic sheet can also be mounted to LED tray housing 3 with an acrylic locking channel, which is a groove built into the tray housing.

In one embodiment, acrylic sheet uses a white acrylic to deflect light from LED light source to create a proper fade/fog line onto a surface. White acrylic creates a smoother light source and is used for low ambient light conditions. It comes in regular gloss or anti-glare finish. Clear acrylic is used to create a sharper fade/fog line onto a surface. Clear acrylic is also used when you want maximum brightness which is good for high ambient light situations.

LED tray housing 3 is a rectangular shaped box built of high strength material that encloses the LED strips and wiring. It has 4 sides and a back with an open face. The acrylic cover attaches to the top open face of this box. All or portions of the interior of the LED tray housing may be reflective to increase the intensity of one or more of the LED strips.

LED Strips (e.g., 4) are used as the light source in this embodiment. The different strips of LEDs may generate light of different color temperatures, intensities, and so on.

In this embodiment, a ¾" NPT Connector (5) is used to provide a connection point to mount the LED tray housing onto the extension 21 (which is mounted to the base assembly 22). The extension is hollow to allow wire to pass therethrough.

A hollow elbow connector 6 having a 90 degree bend is connected at one end to NPT threaded connector 5 and at the other end to extension 21 (a loc line). This connector holds the light board at the proper orientation with respect to the extension and allows the board to be moved 360 degrees.

A hollow double socket connector 7 allows two loc line fittings of same diameter to connect to each other, and is used in this embodiment to connect elbow connector 6 to the other fittings (e.g., 8) that comprise the loc line. The hollow loc line fittings (e.g., 8) can be connected together to create an extension of different lengths, where the extension can be moved into a position and remain in that position.

Slip Ring 9 allows a wired connection between two fixed ends that rotate independently from each other. In this embodiment, the wires from terminal connectors 14 are connected to a first part of slip ring 9, while the wires connected to LED strips 4 are connected to a second part of slip ring 9. The first and second parts of slip ring 9 are electrically coupled to each other (thereby electrically coupling the wires from terminal connectors 14 to the wires to LED strips 4), but can freely rotate with respect to each other. As a result, light board 20 can rotate freely with respect to base 22, without having the wires bind up or break. By comparison, a wired connection without a slip ring could only be rotated by a finite amount before the wires would twist enough to cause damage to the system.

Battery base 10 is a high strength battery enclosure that allows a battery to be securely mounted and removed. The enclosure has built in fittings to mount a plunger and suction cup for securing the device where needed. There are cutouts for 3 switches and a ¾ NPT threaded input hole to mount the ¾ NPT connector. Included on the base are fittings to hold the battery terminal contacts and wire cover.

Suction cup 11 is a rubber coated suction cup that connects to a plunger for mounting the light to smooth surfaces for hands free operation.

Plunger 12 is a plastic device with a hollow chamber that creates a vacuum seal when pumped. This works in combination with suction cup 11.

Power on-off switches 13 allow the control of electrical energy to the LED strips so that they can be powered off or on.

Terminal connectors 14 are quick disconnect fittings that attach to switches in order to make replacing parts easy and convenient.

Battery terminal contacts 15 are metal contacts used to connect the wiring to the battery.

Wire cover 16 is a lightweight durable material used to cover up exposed wires and connections on the battery base for a clean finish.

The lighting system starts with the LED tray housing 3, which is a rectangular boxed enclosure with no front face, 4 sides and a back. ¾" NPT connector 5 is screwed into the ¾ threaded hole of LED tray housing 3. The desired amount and variety of LED strips 4 are installed in LED tray housing 3. If it is desired to have two separate strips turn on with one on position of a switch, then the two LED strips' positive and negative connections are electrically connected. The positive and negative connections of each LED strip are then connected to slip ring 9. Elbow connector 6 is then pressed onto ¾" NPT connector 5. Double socket fitting 7 is then pressed onto elbow connector 6. Multiple loc line fittings (e.g., 8) are connected together until the desired extension length is achieved. The smaller diameter end of the extension is connected to double socket 7. Another ¾" NPT connector is screwed into the ¾ NPT threaded hole on battery base 10. Plunger 12 is set into its slotted position on the battery base with the nipple facing up. Suction cup 11 is pressed onto the plunger nipple and the threaded holes on the suction cup are lined up with hollowed holes on the base. The two screws provided with the suction cup are used to secure the suction cup to the base, which sandwiches the plunger into a secure position. The slip ring wiring is then fed though the ¾ NPT threaded hole on LED tray housing 3 all the way down into the base. Battery terminal contacts 15 are screwed to the positive side of the base. Enough space should be left between the screw and the contact to attach the positive end of the slip ring wiring. The positive wire of the slip ring is attached to the positive contact screw and secured. This step is repeated for the negative side. All remaining wires need to have terminal connectors 14 attached to them. These wires to 3 are attached to Power on-off switches 13. One power wire is connected to the positive battery terminal and 3 outputs are connected to the three switches. The power on-off switches 13 are pressed into the square fitted holes on battery base 10. Wire cover 16 is then placed though battery terminal contacts 15 and are secured to the base. Finally, acrylic cover 2 is placed into LED tray housing 3. Acrylic cover 2 can be secured into LED tray housing 3 with LED tray housing cover 1.

The lighting system operates in this embodiment by powering on and off different varieties of LED lighting with switches, and switching out multiple acrylic covers, as needed. This allows for multiple custom lighting solutions to fit any lighting need. The system can be used as a simple light source to light a dark area, or it can be adjusted to create specific characteristics like fade/fog lines used by PDR technicians. The light is powered by a battery source, which keeps it cordless. The system allows hands free operation by mounting to any smooth surface with the built-in suction cup. It can also be hung with the loc line or it can stand directly on the ground. The device can operate in multiple positions, and can flex and rotate 360 degrees. The base of the lighting system allows for a locking battery that is slid into position and locked into place. The battery is easily removed with a push of a button and can be swapped out with a fresh battery.

The present lighting system has various unique features. For instance, it is the slip ring allows wires from the power source to freely rotate with respect to wires from the light sources, so the system able to flex and rotate into almost any position, as compared to conventional lights which have limited movement due to fixed, often exposed wires. All wires on the present lighting system are internal, preventing the risk of damage to exposed wires. The system uses fittings which increase mobility by allowing the board and base to spin and move freely of one another. The light board can be rotated 360 degrees. There is a locking battery system for easy mounting and removing batteries, and the wires connecting the battery to the light sources are contained within the extension to enhance mobility. The switches are positioned out of the way on the base, where they will not accidently be turned on or off. The suction cup and plunger are built into the system rather than being a separate component. The design is sleek and durable. Acrylic covers on the light board are easily changed out. The system uses quick disconnect terminal connectors so that future customizations or part replacements can be made easily. The system uses custom LED strips that run at different voltages allowing for higher luminosity and longer run times. The system comes with several acrylic covers to allow for multiple lighting arrangements to fit specific needs.

Alternative embodiments of the invention may incorporate many variations of the features described above. For example, the extension could be swapped for different types of tubing or conduit instead of using loc line. The acrylic can have various mounting options, such as slide-in, screw-in, or snap-in, and the material may be non-acrylic. The suction cup can be mounted externally rather than being built into the design. Switches can be moved from base to LED tray housing. Different types of LED strips including temperature, color, voltage, or luminosity can be used. The dimensions of the LED housing can be changed to make it longer, shorter, wider, or thicker. A fixed battery can be used instead of a swappable battery. Extra features can be added, such as a plug-in option in case the battery is dead.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

What is claimed is:

1. A portable lighting apparatus for illuminating a body panel of a vehicle, the apparatus comprising:
   a light board that illuminates the vehicle body panel, wherein the light board has one or more selectable light sources positioned therein that provide a plurality of different types of illumination on the body panel, wherein each of the plurality of types of illumination has a unique set of lighting characteristics;
   a base that includes a battery which is coupled to the light sources and provides power for the light sources, wherein the base further includes a mount that is attachable to the vehicle body panel and thereby secures the base to the vehicle body panel; and
   a flexible extension member coupled between the light board and the base, wherein the extension member is movable with respect to at least one of the light board and the base, wherein the flexible extension member holds the light board in a position that is adjustable laterally and vertically with respect to the base;
   wherein the flexible extension member includes a slip ring which couples a first plurality of electrical conductors that are connected to the battery to a second plurality of electrical conductors that are connected to the light sources, thereby enabling the first plurality of electrical conductors to rotate freely with respect to the second plurality of electrical conductors, wherein the flexible extension member forms a conduit and wherein the slip ring and the first and second pluralities of electrical conductors are positioned within the conduit.

2. The lighting apparatus of claim 1, wherein the one or more selectable light sources comprise a plurality of sets of LED's, wherein the plurality of sets of LED's are selectively powered on and off, thereby providing the plurality of different types of light.

3. The lighting apparatus of claim 1, wherein the one or more selectable light sources comprise a plurality of sets of LED's, wherein the plurality of different types of light are characterized by unique color temperatures.

4. The lighting apparatus of claim 1, wherein the one or more selectable light sources comprise a plurality of sets of LED's, wherein the plurality of different types of light are characterized by unique positions on the light board.

5. The lighting apparatus of claim 1, further comprising a plurality of electrical switches on the base, wherein each of the switches is connected to one or more of the light sources, and wherein the light sources can be turned on and off with the switches.

6. The lighting apparatus of claim 1, wherein the base includes a suction cup mount that is alternately attachable to and releasable from the body panel.

7. The lighting apparatus of claim 6, wherein the base further comprises an exterior surface that enables the lighting apparatus to stand directly on the ground.

8. The lighting apparatus of claim 1, wherein the base has a sliding battery mount that enables the battery to be alternately attached to or removed from the base.

9. The lighting apparatus of claim 8, further comprising a releasable locking mechanism that locks the battery in position when the battery is mounted on the base.

10. The lighting apparatus of claim 1, wherein the slip ring and at least a portion of each of the first and second pluralities of electrical conductors are contained within the extension member.

11. The lighting apparatus of claim 1, wherein the light board includes a housing and a cover that is at least partially transparent, wherein the light sources are mounted on the housing, and wherein the cover is secured to the housing, thereby enclosing the light sources in the light board.

12. The lighting apparatus of claim 11, wherein the cover is removable from the housing and replaceable.

13. The lighting apparatus of claim 1, wherein at least a portion of the interior of the housing is reflective.

14. The lighting apparatus of claim 1, wherein the flexible extension member comprises a plurality of interlocking tubular segments, wherein each of the segments is pivotable with respect to adjacent segments.

15. The lighting apparatus of claim 14, wherein each of the segments forms a ball-and-socket with one of the adjacent segments.

16. The lighting apparatus of claim 1, wherein the base includes a bottom surface that enables the lighting apparatus to stand directly on the ground, and further includes a suction cup mount on a lateral side of the base which enables the base to be alternately attachable to and releasable from the vehicle body panel.

17. The lighting apparatus of claim 16, wherein the base includes a battery mount that enables the battery to be alternately attached to or removed from the base, wherein the bottom surface of the base is formed by the battery.

18. A portable lighting apparatus for illuminating a body panel of a vehicle, the apparatus comprising:

a light board that illuminates the vehicle body panel, wherein the light board has one or more selectable light sources positioned therein that provide a plurality of different types of illumination on the body panel, wherein each of the plurality of types of illumination has a unique set of lighting characteristics;

a base that includes a battery which is coupled to the light sources and provides power for the light sources, wherein the battery forms a bottom surface of the base that enables the lighting apparatus to stand directly on the ground, wherein the base further includes a suction cup mount on a lateral side of the base which enables the base to be alternately attachable to and releasable from the vehicle body panel, wherein the base has a plurality of electrical switches, each of which is connected to one or more of the light sources and enables the light sources to be turned on and off; and a flexible extension member coupled between the light board and the base, wherein the flexible extension member has a plurality of interlocking tubular segments coupled to each other via ball-and-socket joints, wherein each of the segments is pivotable with respect to adjacent segments, wherein the extension member is movable with respect to at least one of the light board and the base and holds the light board in a position that is adjustable laterally and vertically with respect to the base;

wherein the flexible extension member includes a slip ring which couples a first plurality of electrical conductors that are connected to the battery to a second plurality of electrical conductors that are connected to the light sources, thereby enabling the first plurality of electrical conductors to rotate freely with respect to the second plurality of electrical conductors, wherein the flexible extension member forms a conduit and wherein the slip ring and the first and second pluralities of electrical conductors are positioned within the conduit.

19. A method for illuminating a vehicle body panel, the method comprising:

providing a portable lighting apparatus including
a light board that has one or more selectable light sources that provide a plurality of different types of illumination, wherein each of the plurality of types of illumination has a unique set of lighting characteristics,
a base that includes a battery which is coupled to the light sources and provides power for the light sources, wherein the base further includes a mount that is attachable to the vehicle body panel and thereby secures the base to the vehicle body panel, and
a flexible extension member coupled between the light board and the base, wherein the extension member is movable with respect to at least one of the light board and the base, wherein the flexible extension member holds the light board in a position that is adjustable laterally and vertically with respect to the base,
wherein the flexible extension member includes a slip ring which couples a first plurality of electrical conductors that are connected to the battery to a second plurality of electrical conductors that are connected to the light sources, thereby enabling the first plurality of electrical conductors to rotate freely with respect to the second plurality of electrical conductors, wherein the flexible extension member forms a conduit and wherein the slip ring and the first and second pluralities of electrical conductors are positioned within the conduit;

securing the base to the vehicle body panel;

positioning the light board with respect to the vehicle body panel;

switching on one or more of the selectable light sources and thereby illuminating the vehicle body panel.

\* \* \* \* \*